UNITED STATES PATENT OFFICE.

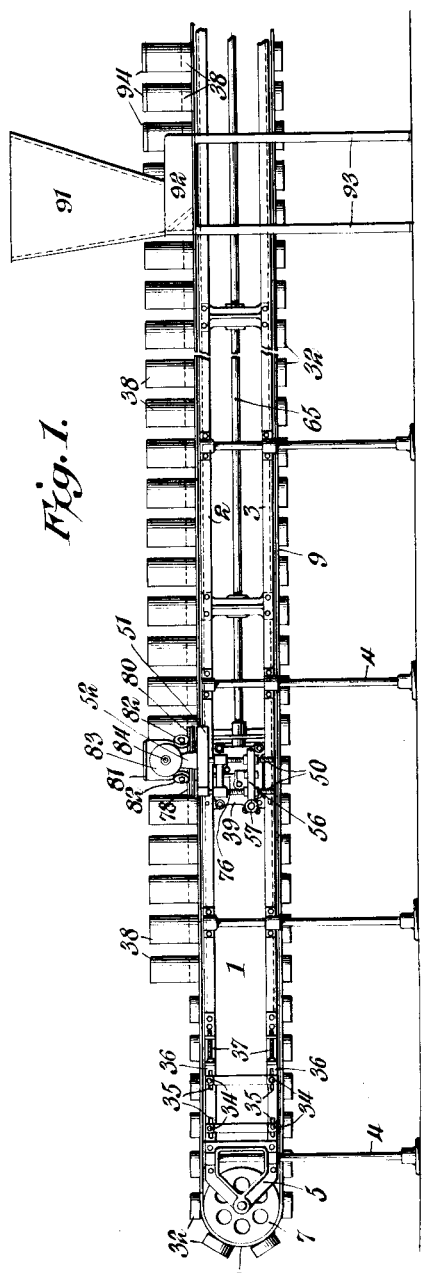

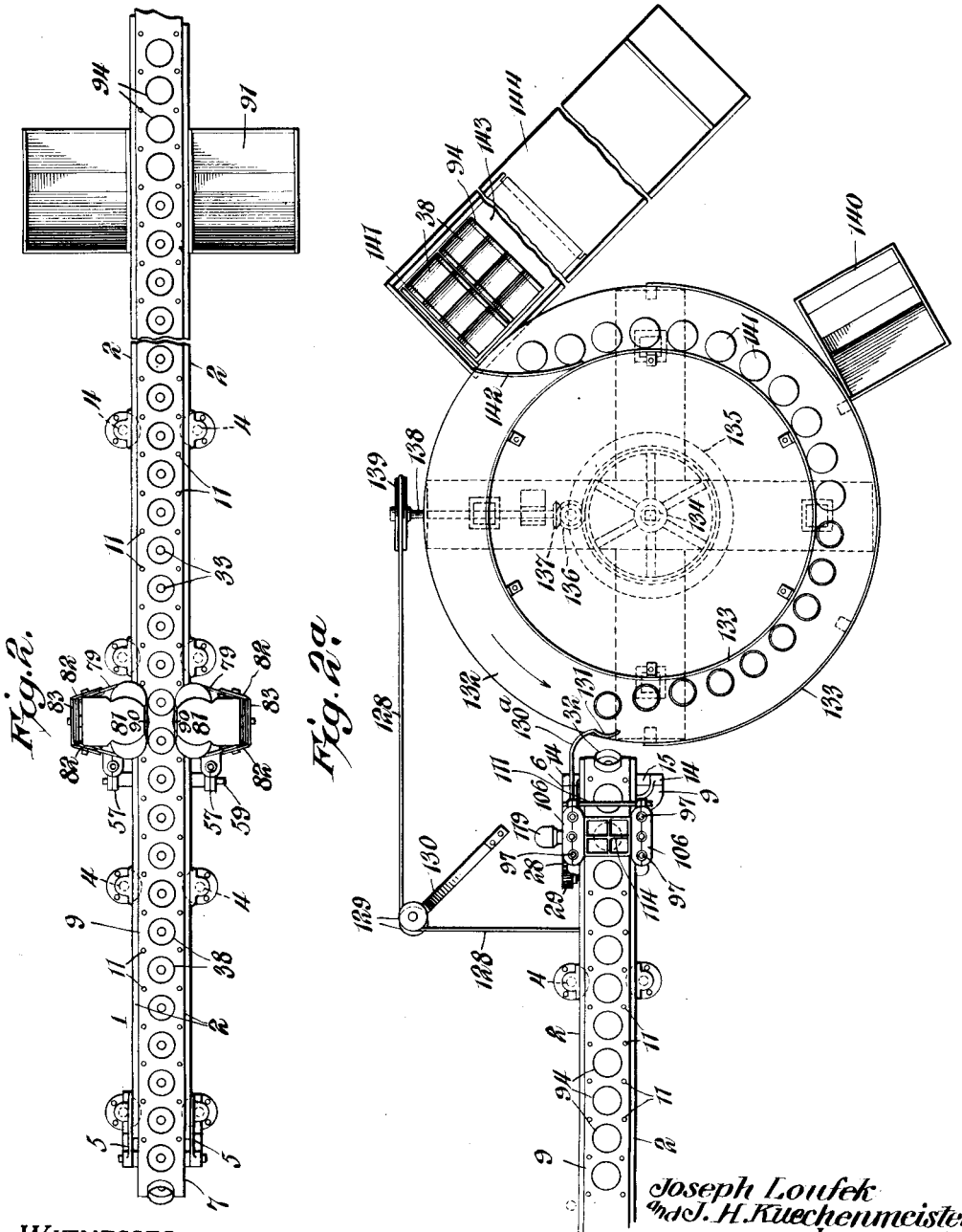

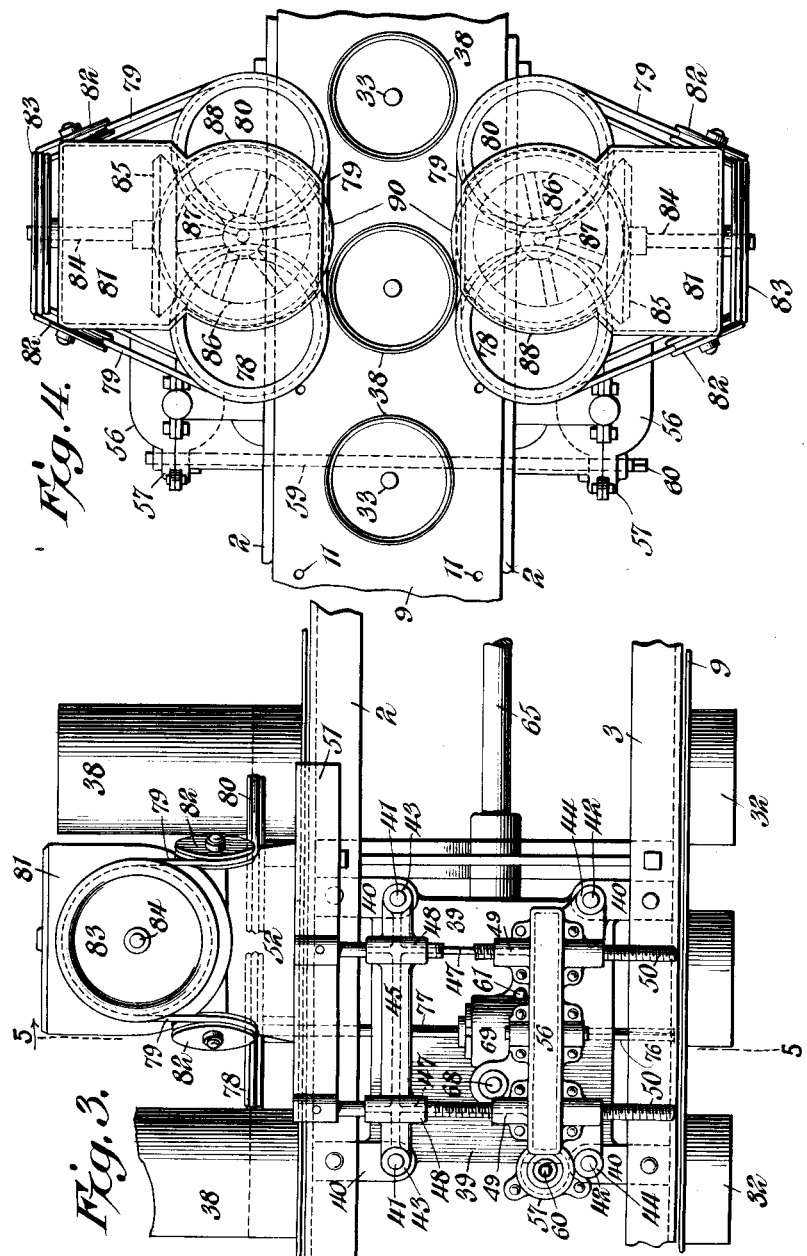

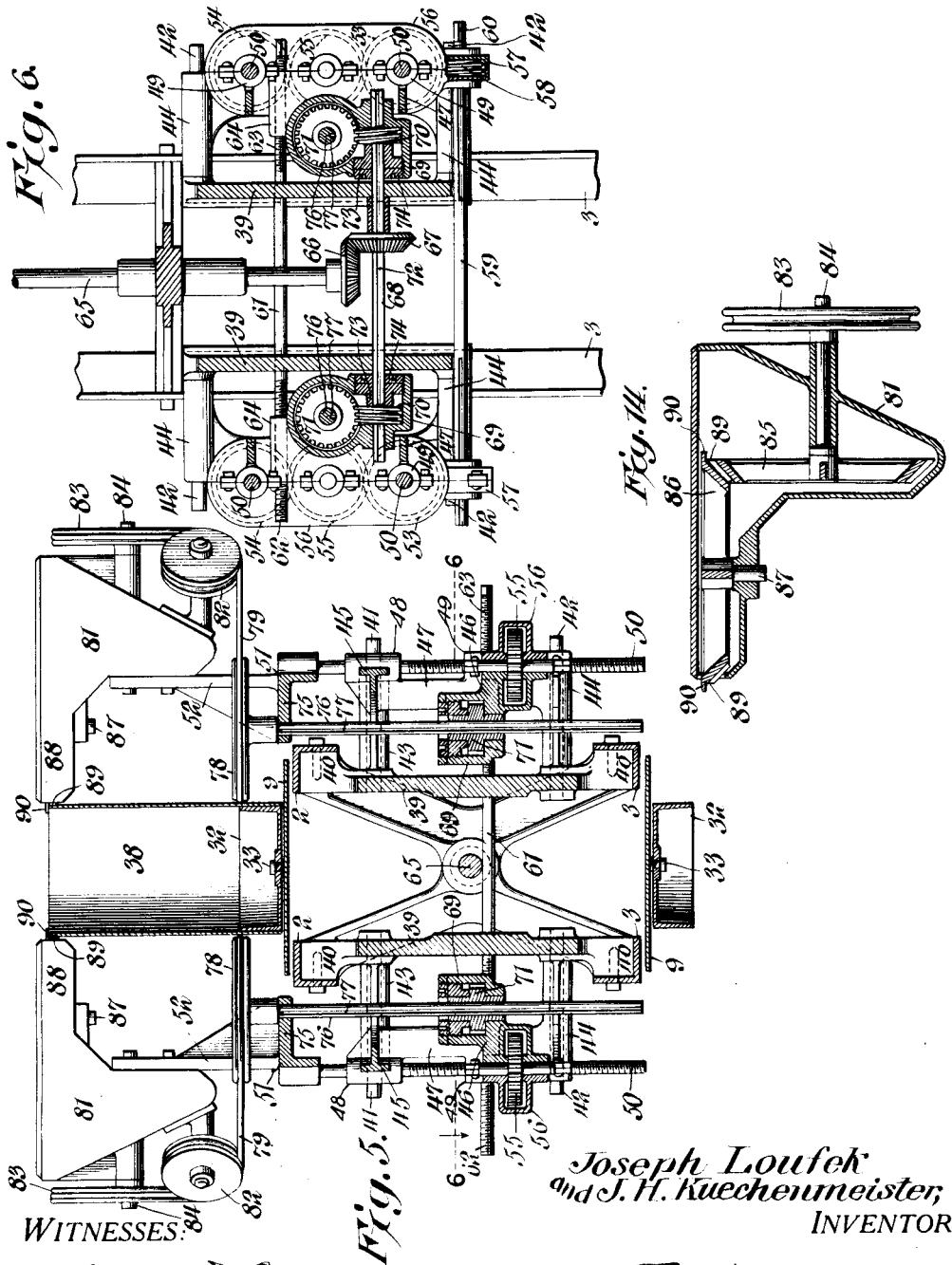

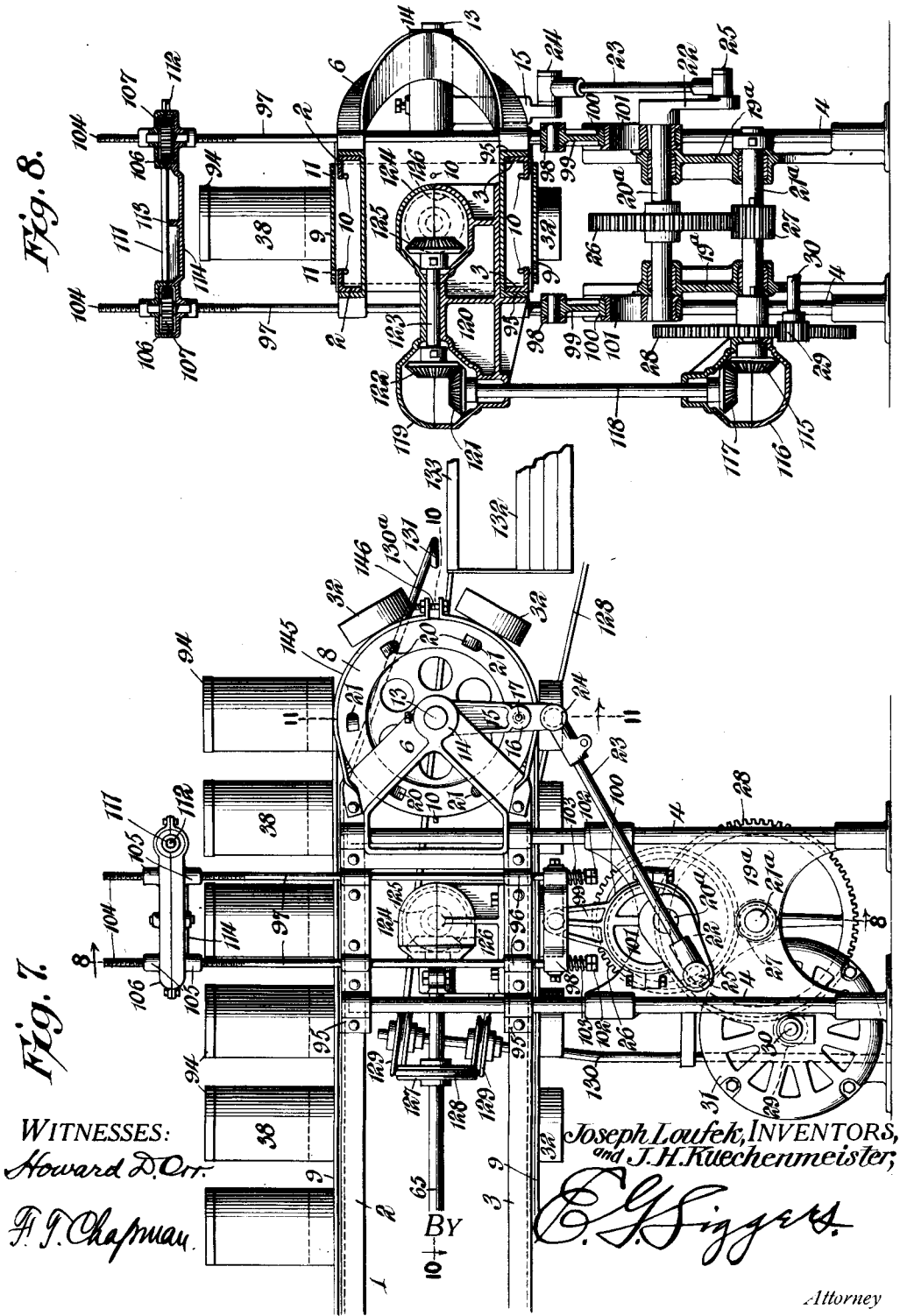

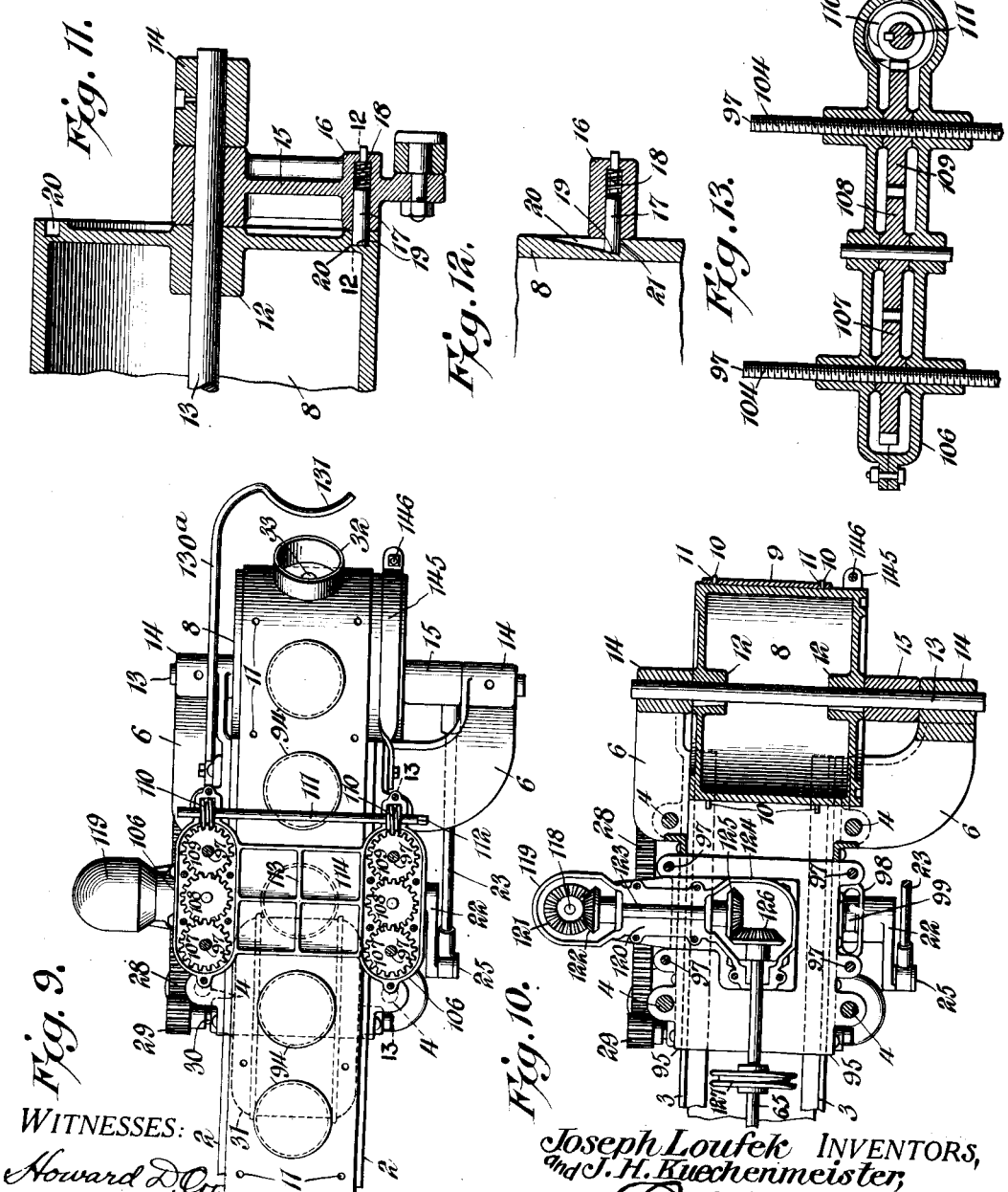

JOSEPH LOUFEK, OF KEOKUK, IOWA, AND JOHN H. KUECHENMEISTER, OF ST. LOUIS, MISSOURI; SAID LOUFEK ASSIGNOR TO CORYDON M. RICH, OF LEE COUNTY, IOWA.

MACHINE FOR APPLYING ENDS TO CARTONS.

1,201,319.                   Specification of Letters Patent.         Patented Oct. 17, 1916.

Application filed October 13, 1915.   Serial No. 55,672.

*To all whom it may concern:*

Be it known that we, JOSEPH LOUFEK and JOHN H. KUECHENMEISTER, citizens of the United States, residing, respectively, at Keokuk, county of Lee, and State of Iowa, and St. Louis, State of Missouri, have invented a new and useful Machine for Applying Ends to Cartons, of which the following is a specification.

This invention has reference to machines for applying the ends or heads to cartons of pasteboard and the like, and its object is to provide a machine whereby the ends or heads may be expeditiously applied with one head cemented in place and the other applied without cement, so that it may be removed when the carton is to be filled.

In accordance with the present invention the cartons are of the character having cylindrical bodies although the machine of the present invention is capable of operation in connection with cartons of other shapes. For the purposes of simplicity of description it will be considered that the cartons are of cylindrical cross-section without limitation of the use of the invention to such particular shape.

Because of the peculiar nature of the material employed in the construction of cartons difficulty is experienced in applying the ends or heads, and especially those cemented in place, by machinery. The bodies of the cartons and also the heads are customarily made of pasteboard by which is meant any fibrous material usually employed for the purpose, and such fibrous material is quite responsive to change in weather conditions, wherefore the heads warp and twist thus making it extremely difficult to apply them by machinery. The machine of the present invention, therefore, is constructed for the application of the heads by hand with mechanical means for the subsequent forcing of the head into place, in which position it becomes firmly united to the body of the carton by previously applied paste or cement.

The machine of the present invention comprises an endless belt with means for driving it progressively step by step and on the belt are equi-spaced carriers, each of a size and shape to enter one end of a carton, which latter is customarily a pasteboard tube of appropriate length open at both ends before the application of the heads or caps.

At an appropriate distance from the point at which the carton bodies are applied to the carriers on the belt, is a paste-applying device so arranged as to apply to that end of the carton remote from the belt a circumferential band of paste, the application occurring during a pause in the travel of the belt. At another appropriate point in the travel of the belt after the application of the paste the cartons are carried by a suitable reservoir or reservoirs containing a supply of heads which are placed by hand upon the then upper ends of the cartons, there being no necessity of any special care in such operation and no attempt is made to force the heads to their final position. This last operation is brought about by appropriate mechanism forming part of the machine, whereby pressure is applied to the placed head in a manner to firmly seat it upon the then upper end of the carton, which end, however, constitutes the bottom end of the carton when the latter is in position to receive material to be packed in the carton.

At the end of the progressive travel of the belt where it begins its return run to the receiving end of the machine, means are provided for removing the headed cartons and inverting them upon a traveling member where the other head is applied by hand. The second head constitutes the cap of the carton, while the first head which is permanently cemented in place constitutes the bottom of the finished carton. The second movable member upon which the carton is deposited is provided with suitable means whereby the completed cartons are automatically removed therefrom and deposited in a packaging receptacle.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is a side elevation of that portion of the machine including the receiving end. Fig. 1ª is a similar elevation, on the same scale of the finishing end of the machine, and forming a continuation of Fig. 1. Fig. 2 is a plan view of so much of the structure as shown in Fig. 1. Fig. 2ª is a plan view of the portion of the structure shown in Fig. 1ª. Fig. 3 is a side elevation on a larger scale than Fig. 1 of the paste-applying mechanism. Fig. 4 is a plan view of the structure shown in Fig. 3. Fig. 5 is a section on the line 5—5 of Fig. 3. Fig. 6 is a section on the line 6—6 of Fig. 5. Fig. 7 is an elevation of the end of the machine containing the head-seating mechanism and also the driving mechanism for the whole machine. Fig. 8 is a section on the line 8—8 of Fig. 7, omitting distant parts. Fig. 9 is a plan view partly in section of the structure shown in Fig. 7. Fig. 10 is a section on the line 10—10 of Fig. 7. Fig. 11 is a section on the line 11—11 of Fig. 7. Fig. 12 is a fragmentary section on the line 12—12 of Fig. 11. Fig. 13 is a section on the line 13—13 of Fig. 9. Fig. 14 is a section of the paste receptacle.

Referring to the drawings there is shown an elongated main frame 1 comprising top and bottom rails 2, 3, respectively, mounted upon and spaced apart by posts 4, which in the installed machine are made fast to a floor or other suitable support.

The rails 2 and 3 are or may be constructed of angle metal and at the ends are joined by yoke frames 5, 6, respectively. Journaled in the opposed yoke frames 5 is an idler pulley 7, and journaled in the yoke frames 6 is a driving pulley 8. Extending about the pulleys and along the track rails 2 and 3 is an endless belt 9 of leather or of some suitable fabric or of metal. The pulley 8 may be in the form of a hollow drum of appropriate size with radially projecting surface pins 10 and the belt 9 is suitably perforated at proper intervals as shown at 11 to be engaged by the pins 10 and propelled along the tracks. The pulley 8 has axial hubs 12 traversed by a spindle 13 to which the hubs may be keyed or otherwise secured, and the spindle 13 extends through journal bearings 14 in the yoke members 6. Mounted on the spindle 13 so as to rock thereon is an arm 15 radial to the spindle and of a length to project somewhat beyond the periphery of the pulley 8. The arm 15 is formed close to the margins of the pulley 8 with a lateral boss 16 in which there is mounted a latch pin 17 constrained to move in one direction by a spring 18, and this latch pin has the end remote from the spring beveled as shown at 19 to seat in taper notches 20 arranged in a circular series about the marginal portion of the corresponding end of the pulley 8. These taper notches each terminate at the deeper end in a shoulder 21 and the swing of the arm 15 is sufficient to carry the latch pin 19 from one notch to the next in order, and to then move the pulley by the return swing of the arm 15 a distance equal to the spacing of the notches. This rotative movement of the pulley agrees with the spacing of the perforations 11 in the belt so that the belt 9 has imparted to it a step by step progressive travel.

The track or frame beams 2 and 3 for the supporting posts 4 at the end adjacent to the pulley 8 are quite close together, and mounted on these posts, which are located on opposite sides of the track frame, are plates 19ª having countershafts 20ª and 21ª mounted therein one above the other. The shaft 20ª carries a crank 22 at the end corresponding to the rock arm 15 and the crank 22 and rock arm 15 are connected together by a link or pitman 23 engaging wrist pins 24 and 25 on the rock arm 15 and crank 22, respectively.

Mounted on the shaft 20ª between the plates 19ª is a gear wheel 26 meshing with a pinion 27 on the shaft 21. The gear wheel 26 and pinion 27 are located between the plates 19ª, while outside of the plate 19ª remote from the crank 22 the shaft 21ª carries a gear wheel 28 meshing with the pinion 29 on the armature shaft 30 of an electric motor 31. The gearing connections between the motor 31 and the shaft 20ª are such that the speed of rotation is sufficiently reduced from the motor to the shaft 20ª and the crank 22 is so related in length to the rock arm 15 that the speed of oscillation of the rock arm 15 is at a rate to impart to the belt 9 the desired step by step progressive movement. The belt 9 carries a longitudinal series of cups 32 held to the belt by pins 33 upon which the cups may rotate for a purpose to be described.

Since it may be necessary from time to time, and is necessary in the ordinary adjustment of the machine to have the belt in a taut condition, the yoke frames 5 are connected to the track beams 2 and 3 by bolts 34 passing through slots 35 in extended leg portions 36 of the yoke frames, while set screws 37 carried by the beams 2 and 3 provide means for moving the yoke frames 5 in the appropriate direction to stretch the belt tightly, the bolts 34 being finally tightened to hold the belt in the adjusted position.

While not so shown, it is assumed that at the receiving end of the machine, which is that end having the pulley 7, there is a supply of carton bodies indicated on the machine at 38. These bodies are or may be plain cylinders of pasteboard, or other such fibrous material, with both ends open. These cylinders are related to the cups 32 in such manner as to fit thereon snugly, yet freely.

At an appropriate distance from the receiving end of the machine there is provided a paste-applying mechanism designed to apply paste or cement to the then upper end of the carton in the form of a circumferential band of paste on the outer wall of the carton. This paste-applying mechanism while shown in Figs. 1 and 2 on a small scale, is better shown in Figs. 3 to 6 to which reference is had more particularly in the description of this paste-applying mechanism.

At the paste-applying part of the machine two like plates 39 are secured by connecting lugs 40 to the corresponding top and bottom rails 2 and 3 of the frame of the machine, so that one plate 39 is on one side of the machine and the other plate 39 is on the other side of the machine. Each plate carries outstanding pins 41, 42 near the corners, the pins 41 being near the top rail 2 and the pins 42 being near the bottom rail 3, and these pins are spaced apart lengthwise of the machine by about the length of the plates 39 in the same direction.

Mounted on the pins 41 are sleeves 43 and mounted on the pins 42 are other sleeves 44. These sleeves are all connected together by cross webs 45 and 46 with other upright webs 47 producing an approximately rectangular skeleton frame having upright sleeves 48 smoothly bored throughout and other sleeves 49 below and alining with the sleeves 48. Extending through the sleeves 49 are threaded rods 50 also extending through the sleeves 48 and at the ends remote from the sleeves 49 made fast to a longitudinally extended base member 51 of an upstanding bracket 52.

The frame portion houses a series of gear wheels 53, 54, 55, said portion of the frame having a removable face cap 56 for access to the gear wheels. The threaded portions of the rods 50 extend through the gear wheels 53 and 54 which are appropriately threaded for the purpose, while the gear wheel 55 is intermediate of the gear wheels 53 and 54 and in mesh therewith, and serves as a connecting gear wheel whereby the gear wheels 53 and 54 are made to turn in the same direction.

The gear wheel 53 besides acting as an ordinary gear wheel is utilized as a worm wheel, being engaged by a worm within a portion 57 of the casing inclosing the gear wheels 53 to 55. A structure of this character is shown in Fig. 13 with especial reference to the other end of the machine from that being described, and will be referred to more in detail in the description of Fig. 13 and associated parts. The worm wheel indicated in Fig. 6 at 58 is mounted on a shaft 59 extending across the machine and engaging another worm wheel in a corresponding casing 57 on said other side of the machine, which second worm wheel meshes with the like train of gearing on said other side of the machine. The shaft 59 has a squared end 60 and is capable of longitudinal movement with reference to one of the worm wheels. There is also provided another shaft 61 extending transversely of the framework of the machine and through the plates 39, the opposite ends 62, 63 of this shaft being reversely screw-threaded and extending through correspondingly threaded nut portions 64 of the frame carrying the train of gears controlling the rods 50.

On turning the shaft 60 the trains of gears 53, 54 and 55 on opposite sides of the machine are caused to simultaneously rotate, so as to elevate or lower the rods 50 with the brackets 52 carried thereby. On rotating the rod 61 the same frames and parts carried thereby are caused to approach or recede one from the other along the pins 41 and 42 because of the oppositely screw-threaded ends 62 and 63 of the rod 61. By this means the parts may be moved toward and from each other or up and down, as desired, and certain structures carried by said movable frames participate in the adjustments thereof.

Extending lengthwise of the machine in about the longitudinal center line thereof is a shaft 65 receiving power from the driving mechanism of the machine in a manner to be described with reference to other figures of the drawing. The shaft 65 terminates within the space between the plates 39 and is there provided with a bevel gear wheel 66 meshing with another bevel gear wheel 67 on a shaft 68 extending transversely of the frame of the machine through the two plates 39 and through journal bearings in a casing 69 on the frame mounted on the pins 41 and 42. Within the casing 69 on opposite sides of the main frame of the machine the shaft 68 carries a worm 70 in mesh with the worm wheel 71 also within the frame 69. The worm wheels 70, while constrained to rotate with the shaft 68 because of a longitudinal key-way 72 therein engaged by a suitable key in the worm wheel, may move lengthwise of the shaft which occurs when the parts carrying the casing 69 are caused to approach and recede, but this does not interfere with the meshing of the worm wheels 70 with the worm gears 71. The worm wheels 70 are held in proper relation to the gears 71 by follower bearing blocks 73 held in place by nuts 74 threaded into the casings 69.

The brackets 52 have lateral extensions or webs 75 on which are mounted and through each of which extends a shaft 76, which latter in the installed position of the machine is upright. The shaft 76 has a longitudinal key-way 77 and extends through the worm wheel 71, which latter engages the key-way by means of a suitable key, so that while the shaft 76 may move lengthwise of the worm wheel 71 the shaft and wheel must always rotate together. On the end of the shaft 76 above the extension 75 of the bracket there is secured a pulley 78 which in the particular showing of the drawings is a grooved pulley designed to receive an endless belt 79, which belt may be a round belt, although some other form of belt may be found to be satisfactory. Mounted on each bracket extension 75 is another pulley 80 and between the pulleys 78 and 80 is a run of the belt 79, so positioned as to engage a carton body 38 adjacent to the cup 32, while the portion of the belt 9 carrying the carton is traveling through the pasting zone.

Each bracket 52 has fast thereto a paste reservoir 81 carrying idler pulleys 82 serving as direction-changing pulleys for the belt 79 and another pulley 83 mounted on a shaft 84 and engaged by the belt 79. The shaft 84 enters the paste reservoir 81 and there carries a bevel gear wheel 85 which rotates upon a horizontal axis, such being the axis of the shaft 84. The gear wheel 85 meshes with another gear wheel 86 mounted on an upright stud 87 so that the gear wheel 86 is located in a horizontal overhang 88 of the reservoir 81. The gear wheel 86 has a peripheral pasting margin 89 provided with an outstanding lip 90.

The margin 89 extends beyond the overhang 88 of the paste reservoir into the path of the traveling carton so as to engage the then upper end of the carton near its upper edge with the lip 90 overhanging the edge of the carton, so that paste may not be distributed on such upper edge, but only about the body of the carton close to the upper edge.

There are two paste receptacles or reservoirs on opposite sides of the path of travel of the cartons, so that such cartons are engaged on opposite sides and the parts driving the paste applying gear wheels and the belt 79 are so arranged that when a carton is introduced between the pasting devices and the belts and comes to rest during the periodic pauses of the travel of the conveyer belt the continued movement of the belts 79 and of the paste applying wheels 86 imparts a rotative movement to the cartons, so a band of paste is applied all about the carton near the then upper end, such band of paste depending upon the width of the paste-applying margins of the paste wheels 86. As soon as the conveyer belt 9 starts again the carton is quickly moved out of engagement with the belts 79 and the paste wheels and the next carton in order is moved into the pasting zone.

The adjustments for the pasting devices provide for cartons of different sizes, so that the range of adaptability of the machine to various cartons is quite large and the machine is readily adjusted to the work to be performed, even though lots of cartons of ostensibly the same size are equally well pasted, although in fact they may actually vary some in size.

On leaving the pasting zone the cartons travel for a short distance permitting the paste to dry to some extent, and they are ultimately brought opposite a bin 91 mounted on a support 92 which may be elevated on legs 93 or otherwise. This bin is assumed to contain a supply of carton heads which are ultimately to constitute the bottoms of the cartons, since the other heads or caps are not permanently fixed to the cartons until the latter have received the material which it is designed to place in them.

The heads indicated at 94 are applied to the pasted ends of the cartons by hand, but the degree of application need not extend further than the mere placing of the head upon the carton without any attempt to force it down into place or into the position it must ultimately occupy. This last condition of application is attended to by mechanical means situated close to the discharge end of the machine where the head is forced into firm engagement and properly centered with respect to the carton. While the mechanical head-applying means is shown in Figs. 1ª and 2ª on a somewhat small scale, it is much better shown in Figs. 7 to 10 and Fig. 13, to which reference will now be had.

Extending along the frame of the machine between the posts 4 at the discharge end of the machine, which posts have already been described with reference to the plates 19ª, are continuations 95 of the yokes 6, and each continuation 95 has sleeves 96 thereon forming guides for upright rods 97 of which there are two on each side of the machine. Each pair of rods 97 is connected at the lower ends by a cross head 98 to which is pivoted an arm 99 on an eccentric strap 100 encircling an eccentric 101 mounted on the shaft 20ª outside of the plate 19ª. The cross head 98 has a limited longitudinal play on the rods 97, the lower ends of the rods having nuts 102 applied thereto with springs 103 between the nuts and the cross head, so that on the down stroke of the rods a cushioning effect is introduced.

Each pair of rods 97 extends above the level of the top of the traveling cartons 38 with the heads 94 thereon and there the rods 97 are screw-threaded, as indicated at 104. The threaded ends 104 of the rods 97 extend through guiding sleeves 105 in alined relation on a two part casing 106 inclosing gear wheels 107, 108 and 109 in intermeshing relation like the gear wheels 53, 54 and 55 already described with relation to the paste applying mechanism. One of the gear wheels, say, the gear wheel 109, is utilized as a worm wheel with which meshes a worm 110 inclosed in the casing 106, and mounted on a shaft 111 extending across the machine and there carrying another worm wheel 110 in engagement with a corresponding gear wheel 109 of another train of gearing on the opposite side of the machine, it being understood that there are two pairs of rods 97 and two trains of gears 107, 108 and 109. The shaft 111 has one end squared, as shown at 112, for the application of a crank or other suitable tool, whereby the casing 106 may be elevated or lowered. This casing has a flange and web-connecting plate 113 extending between the portions of the casing inclosing the gears and is shaped on the under side into a plane follower 114 which is designed to engage the applied cap 94 as it is placed upon the carton by hand and forces it down on the carton into properly seated relation thereon, so that it is fully applied and centered on the carton. The purpose of the adjustment of the follower 114 is to accommodate the machine to different cartons.

In order to drive the shaft 65 from the power element represented by the motor 31, one end of the shaft 21ª carries a bevel pinion 115 inclosed in a suitable casing 116 and there meshing with another bevel pinion 117 on an upright shaft 118 entering another casing 119 carried by a web and flnage frame or support 120 mounted on the lower extensions 95 of the yokes or brackets 6. The shaft 118 carries a bevel pinion 121 within the casing 119 and this pinion meshes with another pinion 122 on a short shaft 123 journaled in the frame 120 and entering another casing 124 where the shaft 123 carries a bevel pinion 125 meshing with another bevel pinion 126 on the corresponding end of the shaft 65, which end enters the casing 124. The shaft 65 has mounted thereon a pulley 127 near but outside of the casing 124 and around this pulley 127 there extends a belt 128 carried about direction-changing pulleys 129 on a supporting base 130 suitably erected on the floor on which the machine is installed or otherwise mounted.

Where the belt 9 passes about the pulley 8 there is provided a finger 130ª having a bent end 131 in the path of the cartons as they move about the pulley 8 and so related to these cartons as to engage them near the ends carried by the cups 32, so that the cartons leave the cups and fall and reverse their position. The detached cartons drop with the heads 94 downwardly upon a revolving table 132 in their path, this table being provided with guard rails 133, so that the inverted cartons do not fall from the table. Rotary motion is imparted to the table 132 by means of a supporting post 134 on which there is mounted a gear wheel 135, which gear wheel is engaged by intermeshing pinions 136, 137 in turn receiving motion from a shaft 138 carrying a pulley 139 around which the belt 128 travels.

At an appropriate point adjacent to the traveling table 132 is a bin 140 in which it is assumed there is a supply of heads for the ends of the cartons not already supplied with heads, and since these heads are designed for temporary hand application so far as the machine of the present application is concerned they may be termed caps. Associated with the table 132 and positioned so as to act after the caps are applied, which caps are indicated at 141, there is a take-off finger 142 causing the cartons to drop into a movable receptacle 143 mounted in a slide or chute 144, so that by proper movements of the receptacle the cartons are deposited therein in proper order.

The mechanisms entering into the machine of the present invention are, of course, all properly timed in action to perform their various operations without interference one with the other, and it has been found in the actual operation of a machine built in accordance with the showing of the drawings that the cartons may have the heads applied and accurately sealed, and then have the caps applied and the cartons deposited in order in receptacles with great rapidity and certainty and with commensurate economy because of such increased rapidity of operation.

To avoid overrunning of the conveyer belt by the step by step actuating mechanism, a brake element is provided in the form of a friction or brake band 145 fast at the ends to one of the yoke frames 6 and intermediately divided and there joined by a tightening bolt 146. The band 145 embraces an appropriate portion of the surface of the pulley 8 near one end of the latter out of the way of the belt 9.

What is claimed is:—

1. A machine for securing heads to carton bodies, comprising progressively traveling means for carrying the carton bodies, means in the path of said bodies for applying a band of paste about one end of each of said bodies, and means movable in the direction of the longitudinal axis of the carton bodies for seating applied heads on the pasted ends of the bodies.

2. A machine for securing heads to carton bodies, comprising progressively traveling means for carrying the carton bodies, means in the path of said bodies for applying a band of paste about one end of each body, means movable in the direction of the longitudinal axis of the carton bodies for seating applied heads on the pasted ends of the bodies, means for discharging the bodies with the seated heads from the carrying means and simultaneously reversing the cartons, other carrying means for the reversed cartons to move them into position to receive other heads, means for discharging the cartons from the second carrying means, and means for receiving and holding the cartons in regular order.

3. A machine for securing heads to carton bodies, comprising an endless belt having rotatable carriers thereon for the carton bodies, means for moving the belt progressively step by step, and continuously operating pasting means in the path of the carton bodies for rotating said bodies and applying a band of paste to the ends thereof remote from the belt.

4. A machine for securing heads to carton bodies, comprising a belt with rotatable carriers thereon for receiving the carton bodies, pasting means and carton rotating means in the path of the cartons, and means for continuously operating the pasting and carton rotating means and for imparting step by step progressive movement to the belt, the belt moving means being timed to bring the cartons successively into operative relation to the pasting and rotating means and there hold them while the paste is applied.

5. A machine for securing heads to carton bodies, comprising an endless belt with a series of rotatable carriers thereon for the carton bodies, means for imparting step by step progressive movement to the belt, and a paste-applying means in the path of the carton bodies provided with continuously running devices for imparting rotative movement to the carton bodies and continuously running paste-applying means in line with the upper end portions of the carton bodies to apply the paste in an endless band thereabout.

6. A machine for securing heads to carton bodies, comprising an endless belt with a series of rotatable carriers thereon for the carton bodies, means for imparting step by step progressive movement to the belt, and a paste-applying means in the path of the carton bodies provided with continuously running devices for imparting rotative movement to the carton bodies and continuously running paste-applying means in line with the upper end portions of the carton bodies to apply the paste in an endless band thereabout, the machine being also provided with means for forcibly seating applied heads to the pasted ends of the carton bodies.

7. A machine for securing heads to carton bodies, comprising an endless belt with a series of rotatable carriers thereon for the carton bodies, means for imparting step by step progressive movement to the belt, and a paste-applying means in the path of the carton bodies provided with continuously running devices for imparting rotative movement to the carton bodies and continuously running paste-applying means in line with the upper end portions of the carton bodies to apply the paste in an endless band thereabout, the machine being also provided with means for forcibly seating applied heads to the pasted ends of the carton bodies, and the pasting means and seating means being spaced apart for a distance to provide a zone through which the pasted bodies travel where the heads are manually placed upon the pasted ends of the carton bodies.

8. A machine for securing heads to carton bodies, comprising an endless band with rotatable carriers thereon for receiving the carton bodies, means for imparting step by step progressive movement to the band, continuously operating means in the path of the applied carton bodies for rotating said bodies together with the carriers each during a pause in the progressive movement of the belt, means for applying paste to the ends of the carton bodies remote from the belt while the bodies are being rotated, means for pressing applied heads to the pasted ends of the carton bodies into seating relation thereto, the pressing means being spaced from the pasting means to provide for the manual application of the heads to the carton bodies after being pasted and before being subjected to pressure, means at the end of the active run of the belt for removing the headed carton bodies and reversing said bodies in position, a carrier for receiving the reverse carton bodies and having a range of travel to provide for the placing of other heads thereon, and means for removing the carton bodies from the second carrier after receiving the second heads.

9. A machine for securing heads to carton bodies, comprising an endless band with rotatable carriers thereon for receiving the carton bodies, means for imparting step by step progressive movement to the band, continuously operating means in the path of the applied carton bodies for rotating said bodies together with the carriers each during a pause in the progressive movement of the belt, means for applying paste to the ends of the carton bodies remote from the belt while the bodies are being rotated, means for pressing applied heads to the pasted ends of the carton bodies into seating relation thereto, the pressing means being spaced from the pasting means to provide for the manual application of the heads to the carton bodies after being pasted and before being subjected to pressure, means at the end of the active run of the belt for removing the headed carton bodies and reversing such bodies in position, a carrier for receiving the reverse carton bodies and having a range of travel to provide for the placing of other heads thereon, and means for removing the carton bodies from the second carrier after receiving the second heads, the second named carrier having associated therewith means for receiving the headed carton bodies from the discharge end of the second carrier and retaining them in orderly arrangement.

10. In a machine for securing heads to carton bodies, a traveling belt with a series of rotatable means thereon for receiving the carton bodies, and means for applying paste to the ends of the bodies remote from the carriers and at the same time imparting rotative movement to the bodies comprising continuously running devices in the path of those ends of the carton bodies applied to the carriers and arranged on opposite sides of said path and other continuously running devices in the path of those ends of the carton bodies remote from the carriers and arranged on opposite sides of said path for applying paste to the outer walls of the carton bodies adjacent to the said edge.

11. In a machine for securing heads to carton bodies, a traveling member with carriers thereon for holding the carton bodies in an upright position, means for applying paste to the upper ends of the outer walls of the carton bodies, and means for engaging the carton bodies adjacent to the carriers for imparting rotative movements to the carton bodies about their longitudinal axes.

12. In a machine for securing heads to carton bodies, a traveling conveyer with carriers thereon each receiving one end of a carton body and sustaining the latter in an upright position while traveling with the conveyer, and means for rotating the carton bodies and applying paste to the upper ends thereof, comprising traveling belts on opposite sides of the conveyer in position to engage the carton bodies adjacent to the carriers, means for actuating the belts to impart opposite directions of travel to those runs of the belts engaging the cartons, paste reservoirs on opposite sides of the path of the carton bodies, and paste applying means carried by the paste reservoirs in position to apply paste to the upper ends of the outer surfaces of the cartons while being revolved.

13. In a machine for securing heads to carton bodies, a traveling conveyer with carriers thereon each receiving one end of a carton body and sustaining the latter in an upright position while traveling with the conveyer, and means for rotating the carton bodies and at the same time applying paste to the upper ends thereof comprising traveling belts on opposite sides of the conveyer in position to engage the carton bodies adjacent to the carriers, means for actuating the belts to cause those runs of the belts engaging the carton bodies to travel in opposite directions, paste reservoirs on opposite sides of the path of the conveyer, paste-applying means in coactive relation to the reservoirs and in position to apply a band of paste to the upper ends of the carton bodies while revolving, means for elevating and lowering the rotating and paste-applying means, and means for causing the approach or recession of the carton rotating and paste-applying means on opposite sides of the path of the traveling cartons.

14. In a machine for securing heads to carton bodies, a traveling conveyer with means thereon for supporting carton bodies each in an upright position, and means for rotating the carton bodies and simultaneously applying paste thereto comprising paste reservoirs on opposite sides of the path of the traveling carton bodies, paste-applying means associated with the reservoirs in position to apply a band of paste to the upper end of each carton body, means on opposite sides of the path of travel of the carton bodies for imparting rotative movements to said bodies, a supporting member on each side of the path of travel of the conveyer for the paste-applying and carton rotating means there located, elevating and lowering means for each supporting member, and connections between the elevating and lowering means for causing the approach and recession thereof together with the supporting members thereon.

15. In a machine for securing heads to carton bodies, a traveling conveyer with means thereon for supporting carton bodies each in an upright position and means for rotating the carton bodies and simultaneously applying paste thereto, comprising paste reservoirs on opposite sides of the path of the traveling carton bodies, paste applying means associated with the reservoirs in position to apply a band of paste to the upper end of each carton body, means on opposite sides of the path of travel of the carton bodies for imparting rotative movements to said bodies, a supporting member on each side of the path of travel of the conveyer for the paste-applying and carton rotating means there located, elevating and lowering means for each supporting member, and connections between the elevating and lowering means for causing the approach and recession thereof together with the supporting members thereon, the paste applying means and the rotating means having driving means with slip connections providing for the stated adjustments of the parts.

16. In a machine for securing heads to carton bodies, a traveling conveyer with means thereon for sustaining carton bodies in an upright position while traveling with the conveyer, and means for rotating the carton bodies and applying paste to the upper ends thereof, comprising a support on each side of the traveling conveyer, traveling belts and pulleys therefor on each support, a paste reservoir on each support, a paste-applying wheel in each reservoir, connections between one of the pulleys and the paste applying wheel for driving the latter, screw rods supporting each carrier, a frame in which the screw rods are mounted with the frame on one side of the conveyer movable toward and from the frame on the other side of the conveyer, means for simultaneously moving the frame in opposite directions, interconnecting gearing between the screw rods with nuts for causing the elevations and depression of the screw rods, and interconnections between the gearing for causing the simultaneous elevation and depression of the carriers and the parts thereon.

17. In a machine for securing heads to carton bodies, a traveling conveyer with means thereon for sustaining carton bodies in an upright position while traveling with the conveyer, and means for rotating the carton bodies and applying paste to the upper ends thereof, comprising a support on each side of the traveling conveyer, traveling belts and pulleys therefor on each support, a paste reservoir on each support, a paste applying wheel in each reservoir, connections between one of the pulleys and the paste applying wheel for driving the latter, screw rods supporting each carrier, a frame in which the screw rods are mounted with the frame on one side of the conveyer movable toward and from the frame on the other side of the conveyer, means for simultaneously moving the frames in opposite directions, interconnecting gearing between the screw rods with nuts for causing the elevation and depression of the screw rods, and interconnections between the gearing for causing the simultaneous elevation and depression of the carriers and the parts thereon, the machine being also provided with driving means and connections therefrom to certain of the pulleys for imparting motion thereto for driving the belts and the paste-applying wheels.

18. In a machine for securing heads to carton bodies, a traveling conveyer belt provided with a series of rotatable cups adapted to receive and sustain carton bodies in an upright position, means for imparting step by step progressive movement to the conveyer belt, other belts on opposite sides of the conveyer belt in the path of the traveling cartons and in position to engage the cartons where sustained by the cups, paste receptacles and rotatable paste wheels therein on opposite sides of the path of the cartons and in position to apply a band of paste to the outer walls of the cartons near the upper edges thereof, means for elevating and lowering the carton revolving belts and the paste applying wheels, means for moving the said belts and paste applying wheels on opposite sides of the conveyer toward and from each other, and means for driving the belts and paste applying wheels having slip connections therewith to provide for the stated adjustments.

19. In a machine for securing heads to carton bodies, means for rotating the carton bodies and simultaneously applying paste thereto, comprising reservoirs on opposite sides of the carton bodies near the upper ends thereof, paste wheels rotatable on axes perpendicular to the longitudinal axis of the carton body with each wheel having a peripheral paste applying edge and a radial flange adapted to overhang the upper edge of the carton body while receiving the paste, spaced pulleys on opposite sides of the carton and positioned to engage the carton body at a low point with the pulleys on each side of the carton body provided with a belt having a run adapted to rotate the carton body, and direction-changing pulleys associated with the belt for connecting said pulleys to the paste applying wheels, one of said pulleys on each side of the carton body having means for applying power thereto to drive it.

20. In a machine for securing heads to carton bodies, means for causing a series of carton bodies to travel progressively step by step, means for applying paste exteriorly to one end of each carton body, and means for seating a head on and about the pasted end after said head has been manually placed thereon, comprising a reciprocatory follower having a range of movement to force the head into close and even relation to the pasted end.

21. In a machine for securing heads to carton bodies, means for causing a progressive step by step travel of a series of carton bodies, means for applying paste exteriorly to the carton bodies during a pause in the travel of each, and means for seating on to the carton bodies heads applied to said carton bodies after the pasting of the latter, comprising a continuously reciprocable follower movable into engagement with an applied head and timed in operation to force the head into firm seating relation to the carton body during a pause in the travel of such body.

22. In a machine for securing heads to carton bodies, means for causing a progressive step by step travel of a series of carton bodies, means for applying paste to the carton bodies during a pause in the travel of each, and means for seating the heads applied to the carton bodies after the pasting of the latter, comprising a continuously reciprocable follower movable into engagement with an applied head and timed in operation to force the head into firm seating relation to the carton body during a pause in the travel of such body, said seating means comprising reciprocable rods carrying the follower, and means for reciprocating said rods with the follower, the reciprocating means having elastic connections with the rods.

23. In a machine for securing heads to carton bodies, means for causing a progressive step by step travel of a series of carton bodies, means for applying paste to the carton bodies during a pause in the travel of each, and means for seating the heads applied to the carton bodies after the pasting of the latter, comprising a continuously reciprocable follower movable into engagement with an applied head and timed in operation to force the head into firm seating relation to the carton body during a pause in the travel of such body, said seating means comprising reciprocable rods carrying the follower, and means for reciprocating said rods with the follower, the reciprocating means having elastic connections with the rods, and the rods and follower having threaded and gearing connections with the gearing connections interconnected for the adjustment of the follower on all the rods simultaneously.

24. A machine for securing heads to carton bodies comprising a conveyer with means thereon for supporting a series of carton bodies, means for imparting a progressive step by step travel to the conveyer, means for applying paste to each carton body during a pause in the travel of the conveyer, means for seating an applied head on the pasted end of each carton body during a pause in the travel of the conveyer with the seating means spaced from the paste applying means for a distance permitting the manual application of the heads to the pasted carton bodies, and means for removing the headed carton bodies from the conveyer and inverting said carton bodies, comprising a finger having a free end in the path of the carton bodies and the conveyer at such point having means for diverting its course of travel in a direction to engage the finger while the carton bodies are substantially horizontal.

25. In a machine for securing heads to carton bodies, an endless conveyer belt having an upper active run and provided with means for sustaining carton bodies, a driving roller having one end of the belt about which the belt travels, means for imparting step by step progressive movement to the belt, paste applying means associated with the belt for producing upon each carton body near one end a circular band of paste during a pause in the travel of the carton, seating means for heads applied to the pasted heads of the cartons, said seating means being spaced from the paste applying means in the direction of travel of the belt for a distance to permit the manual placing of the heads on the pasted ends of the cartons, a revolving carrier for cartons at the discharge end of the belt, means at said discharge end of the belt for inverting the cartons leaving the belt, means for imparting to the rotatable carrier a continuous movement of rotation, and means associated with the rotatable carrier for removing the cartons therefrom, said carton removing means being spaced from the discharge end of the belt a distance to permit the manual placing of other heads upon the cartons while upon the revolving carrier.

In testimony, that we claim the foregoing as our own, we have hereto affixed our signatures in the presence of two witnesses.

JOSEPH LOUFEK.
JOHN H. KUECHENMEISTER.

Witnesses of J. Loufek:
  ARCHER C. UHLLER,
  G. L. NORMAN.

Witnesses of J. H. Kuechenmeister:
  L. B. WRIGHT,
  HENRY W. KUECHENMEISTER.